United States Patent [19]
Staver

[11] Patent Number: 5,689,331
[45] Date of Patent: Nov. 18, 1997

[54] LASER APPARATUS WITH WANDER CORRECTION

[75] Inventor: Phillip Randall Staver, Hagaman, N.Y.

[73] Assignee: General Electric Company, Schenectady, N.Y.

[21] Appl. No.: 569,889

[22] Filed: Dec. 8, 1995

[51] Int. Cl.$^6$ .............. G01J 1/00; G01N 21/41; G01B 11/14

[52] U.S. Cl. .............. 356/153; 356/123; 356/131; 356/375

[58] Field of Search .............. 356/152, 153, 356/123, 131, 143, 142, 375, 385, 363, 358–360; 250/491.1, 459.1, 461.1

[56] References Cited

U.S. PATENT DOCUMENTS

| | | |
|---|---|---|
| 3,942,894 | 3/1976 | Maier .............. 356/153 |
| 4,146,329 | 3/1979 | King et al. .............. 356/152 |
| 4,770,529 | 9/1988 | Levinson et al. .............. 356/153 |
| 4,831,246 | 5/1989 | Wallentine et al. .............. 250/20 |
| 5,054,925 | 10/1991 | Hunter .............. 356/363 |
| 5,055,695 | 10/1991 | Lange .............. 250/459 |
| 5,291,263 | 3/1994 | Kong .............. 356/5 |

OTHER PUBLICATIONS

NewFocus Inc., "Motorized Multi-Axis Devices", two pages of producct literature. (no dates available).

*Primary Examiner*—Frank G. Font
*Assistant Examiner*—Michael P. Stafira
*Attorney, Agent, or Firm*—Marvin Snyder

[57] ABSTRACT

A laser apparatus includes a laser for emitting a laser beam which is reflected from a primary mirror through a primary lens in a primary optical path and focused at a primary spot. A portion of the laser beam leaks through a back face of the mirror and is directed through a reference lens and focused at a reference spot in a reference optical path. Angular wander of the laser beam on the primary mirror is corrected by measuring the lateral position of the reference spot and adjusting the primary optical path to decrease lateral wander of the primary spot.

11 Claims, 3 Drawing Sheets

LASER APPARATUS WITH WANDER CORRECTION

The U.S. Government has rights in this invention in accordance with Contract No. MDA 972-94-30020 awarded by D.A.R.P.A.

BACKGROUND OF THE INVENTION

The present invention relates generally to laser systems, and, more specifically, to correcting angular beam wander therein.

In one type of laser system, a laser beam is directed against a mirror and reflected through a focusing lens to a corresponding spot. The laser beam may be used in a machining operation such as laser drilling holes in a metallic workpiece requiring accurate position of the holes and accurate drilled diameters thereof. The focused beam may itself be directed on the workpiece, or may be channeled through a suitable optical fiber, with the output beam therefrom then being used for drilling the holes. Furthermore, the laser beam may be directed through a spatial filter for providing a suitably filtered beam for use as required.

Accordingly, the accurate position of the focused beam spot is critical to the effective use of the laser in these exemplary applications. Lateral or transverse wander of the focused beam radially away from the intended centerline axis direction of the beam is therefore undesirable. In the example where the focused beam directly impinges the workpiece for drilling a hole, lateral beam wander adversely affects the position and diameter of the hole. In the example of the optical fiber, lateral beam wander which spills laterally over the edge of the optical fiber inlet face can cause undesirable damage of the fiber itself. And in the example of the spatial filter, lateral beam wander can cause erratic variations in the transmitted power due to the occurrence of random clipping.

Lateral wander of the focused beam may be caused by angular wander of the beam upstream or upbeam of the focusing lens. Angular beam wander becomes a significant concern in high power, amplified lasers typically used in metal machining operations such as laser drilling. Angular beam wander is also significant in optical mediums having an index of refraction which varies with time and position and therefore creates a time varying wander or tilt in the propagating laser beam. An example of such an optical medium is a typical room in which a high power laser system is contained, wherein fluctuations in the room air cause turbulent atmospheric conditions which promote or amplify the angular beam wander. Also, wander can be induced by elements of the laser system itself. The angular wander is manifested as an irregular motion of the lateral or transverse location of the focused spot. These lateral motions occur on time scales typical of thermo-mechanical instabilities on the order of about 10–100 Hz.

Accordingly, it is desirable to correct angular beam wander for improving the accurate positioning of the focused laser beam.

SUMMARY OF THE INVENTION

A laser apparatus includes a laser for emitting a laser beam which is reflected from a primary mirror through a primary lens in a primary optical path and focused at a primary spot. A portion of the laser beam leaks through a back face of the mirror and is directed through a reference lens and focused at a reference spot in a reference optical path. Angular wander of the laser beam on the primary mirror is corrected by measuring the lateral position of the reference spot and adjusting the primary optical path to decrease lateral wander of the primary spot.

BRIEF DESCRIPTION OF THE DRAWINGS

The invention, in accordance with preferred and exemplary embodiments together with further objects and advantages thereof, is more particularly described in the following detailed description taken in conjunction with the accompanying drawings in which.

DESCRIPTION OF THE PREFERRED EMBODIMENT(S)

Figure 1:
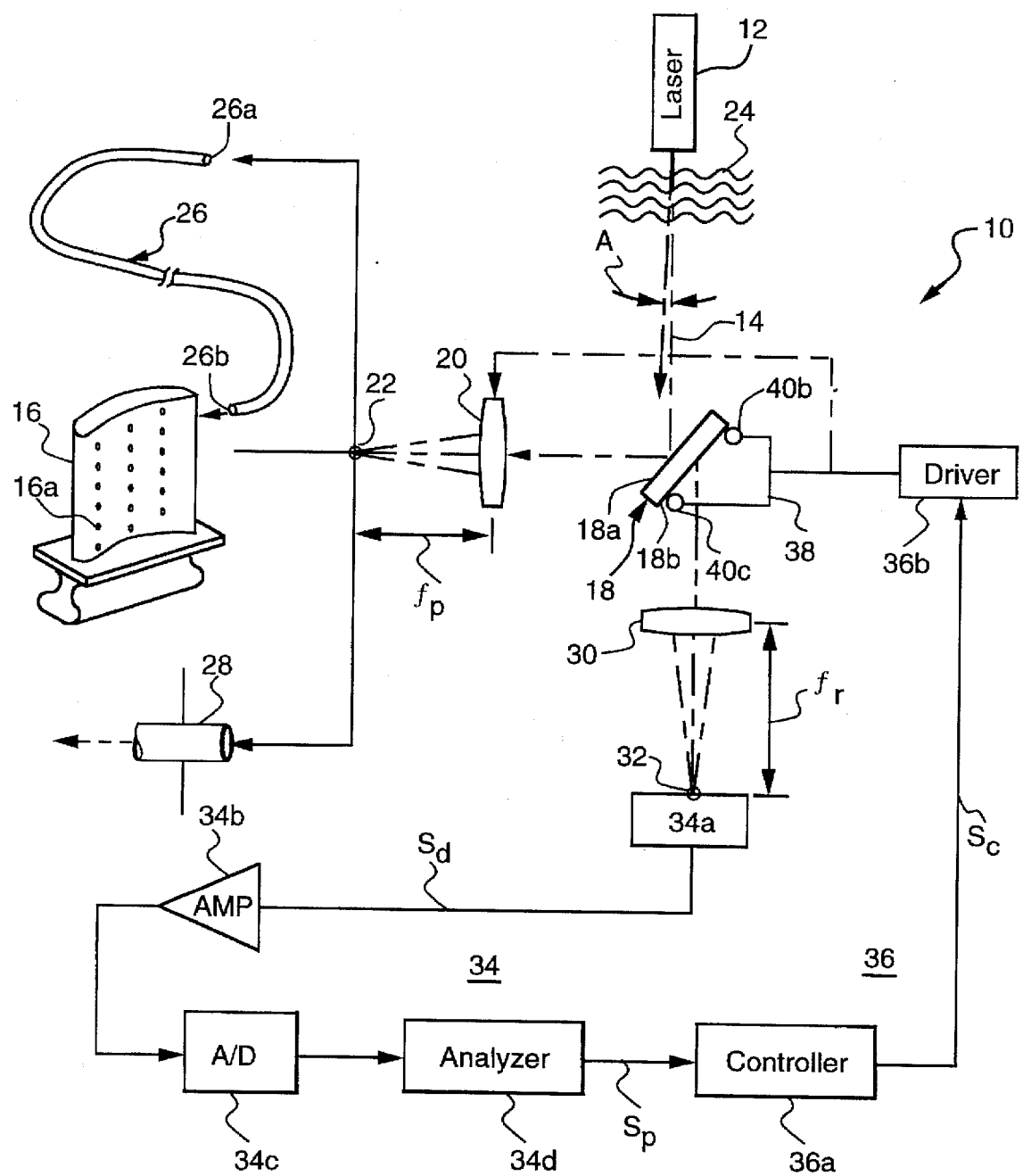
FIG. 1 is a schematic representation of an exemplary laser apparatus in accordance with one embodiment of the present invention having an adjustable primary optical path in response to a reference optical path.

Illustrated schematically in FIG. 1 is an exemplary laser apparatus or system 10 in accordance with one embodiment of the present invention. The apparatus includes a conventional laser 12 which may take any suitable form for emitting a relatively high power laser beam 14 effective for use in laser machining a metallic workpiece 16, such as a gas turbine engine rotor blade requiring accurately positioned and accurate diameter cooling air holes 16a therein. The laser 12 may be a conventional Nd:YAG laser, for example.

A first or primary mirror 18 is suitably aligned with the laser 12 for reflecting the beam 14 from a front face 18a thereof, and leaking a portion of the beam 14 through a back face 18b thereof, thus producing a leakage beam. The primary mirror 18 is a conventional, highly reflective mirror, greater than about 99% reflectivity for example, with the back face 18b thereof being preferably polished for emitting the leakage beam therefrom.

A first or primary focusing lens 20 is suitably aligned with the mirror front face 18a for receiving therefrom the reflected beam and focusing the beam at a first or primary focus spot 22. The laser 12, primary mirror 18, and lens 20 define a primary optical path of the laser beam 14 from the laser 12 to the primary spot 22.

The laser 12 itself may have a suitably high power which can cause the laser beam 14 to experience angular beam wander, which is schematically illustrated in FIG. 1 by the exaggerated tilt or angular deviation of the laser beam 14 from its intended axial centerline direction as represented by the angle A. Angular wander of the laser beam 14 causes a corresponding angular wander or tilt of the reflected laser beam from the primary mirror 18 toward the primary lens 20, which in turn causes the primary spot 20 to laterally wander or move in a transverse or radial direction from the intended focal point of the primary lens 20.

Furthermore, an optical medium 24, such as typical heated room air, may be disposed between the laser 12 and the primary mirror 18, and has an index of refraction which varies in time and position for effecting the angular wander in the laser beam 14. Angular wander may be produced solely by the high power laser 12, or alternatively by the optical medium 24 itself, or by the combination thereof. The angular wader is manifested at the focal point of the primary lens 20 by irregular motion of the transverse or lateral location of the focused primary spot 22. These motions occur on a time scale typical of thermo-mechanical instability which is on the order of about 10–100 Hz. They can also be due to long term thermo-mechanical drifts which have low frequencies less than about 1 Hz.

As indicated above in the Background section, lateral wander of the primary spot 22 caused by angular wander of the laser beam 14 in the primary optical path is undesirable. For example, the focused laser beam at the primary spot 22 may itself be directly positioned on the surface of the workpiece 16 for laser machining or drilling the holes 16a therein. The angular wander introduces errors in the accurate lateral position of each hole 16a, and in the desired diameter thereof. In an alternate embodiment also illustrated in FIG. 1, a conventional optical fiber 26 includes an inlet face 26a which may be aligned with the primary lens 20 for itself directly receiving the primary focused beam at the spot 22. The fiber 26 also includes an outlet face 26b which defines a laser torch conventionally selectively positionable adjacent to the workpiece 16 for laser machining or drilling the holes 16a therein. Lateral wander of the primary spot 22 due to angular wander of the laser beam 14 is undesirable as indicated above because spilling of the focused laser beam over the edge of the fiber inlet face 26a can cause significant damage thereto.

In yet another embodiment also illustrated schematically in FIG. 1, a conventional spatial filter 28 in the form of a small orifice may be aligned with the primary lens 20 for receiving the primary focused beam at the primary spot 22, with the filter 28 suitably filtering the focused laser beam. Lateral wander of the primary spot 22 due to angular wander of the laser beam 14 can lead to erratic variations in the transmitted power due to the occurrence of random clipping in the focused laser beam by the filter 28, which is undesirable.

Accordingly, the laser apparatus 10 illustrated in FIG. 1 includes additional components in accordance with the present invention for correcting the angular beam wander. More specifically, a reference focusing lens 30 is suitably aligned with the mirror back face 18b for receiving the leakage laser beam therefrom and focusing the leakage beam at a reference focus spot 32 in a reference optical path defined between the back face 18b of the primary mirror 18 through the reference lens 30 to the reference spot 32. The reference lens 30 may take any conventional configuration and has a reference focal length $f_r$, with the primary lens 20 having a primary focal length $f_p$.

The reference optical path is used to measure the amount of angular wander in the laser beam 14 so that lateral wander of the primary spot 22 may be corrected by decreasing the magnitude thereof. Accordingly, means designated generally at 34 are aligned with the reference lens 30 for measuring the lateral or transverse position of the reference spot 32 which directly corresponds with the lateral or transverse position of the primary spot 22 since both spots are controlled by the position of the common primary mirror 18 from which they originate. Additional means designated generally at 36 are operatively joined to the measuring means 34 for adjusting or correcting the lateral wander of the primary spot 22 in response to lateral movement of the reference spot 32 due to the angular wander of the laser beam 14 on the primary mirror front face 18a.

The measuring means 34 preferably includes an optical detector 34a suitably aligned with the reference lens 30 for detecting the lateral position of the reference spot 32. The detector 34a may take any suitable form such as a conventional solid-state charge coupled device (CCD), or a conventional quadrant detector which can measure the motion or position of the reference spot 32 at the focal plane of the reference lens 30. The detector 34a produces an electrical detector signal $S_d$ indicative of the lateral position of the reference spot 32 which is suitably amplified in a conventional amplifier 34b, and digitized in a conventional analog-to-digital (A/D) converter 34c. A suitable electronic analyzer 34d is operatively joined to the detector 34a in turn through the amplifier 34b and digitizer 34c for producing a position signal $S_p$ corresponding with the detected lateral position of the reference spot 32. The analyzer 34d may take any conventional form such as a specifically dedicated electronic circuit or a general purpose programmable digital computer for translating the detected signal $S_d$ into a suitable position signal $S_p$.

The cooperating correcting means 36 includes a suitable electrical controller 36a operatively joined to the analyzer 34d for producing a control or correction signal $S_c$ in response to the position signal $S_p$. The controller 36 may take any conventional form including a dedicated electronic circuit or a general purpose programmable digital computer, and if desired may be combined with the amplifier 34b, digitizer 34c, and analyzer 34d in one electronic component.

The correcting means 36 also includes an electrical driver 36b operatively joined to the controller 36a and responsive thereto. Means in the exemplary form of an adjustable-tilt mirror mount 38 are provided for adjusting the primary optical path in response to the correction signal $S_c$ to decrease the lateral wander of the primary spot 22. In one exemplary embodiment, the mount 38 supports the primary mirror 18 for selectively tilting the primary mirror 18 to in turn tilt the reflected beam toward the primary lens 20. The driver 36b and the tilt mount 38 may take any conventional form, including piezo-electric-transducers (PZT) cooperating with the primary mirror 18 for controlling its tilt position.

Figure 2:
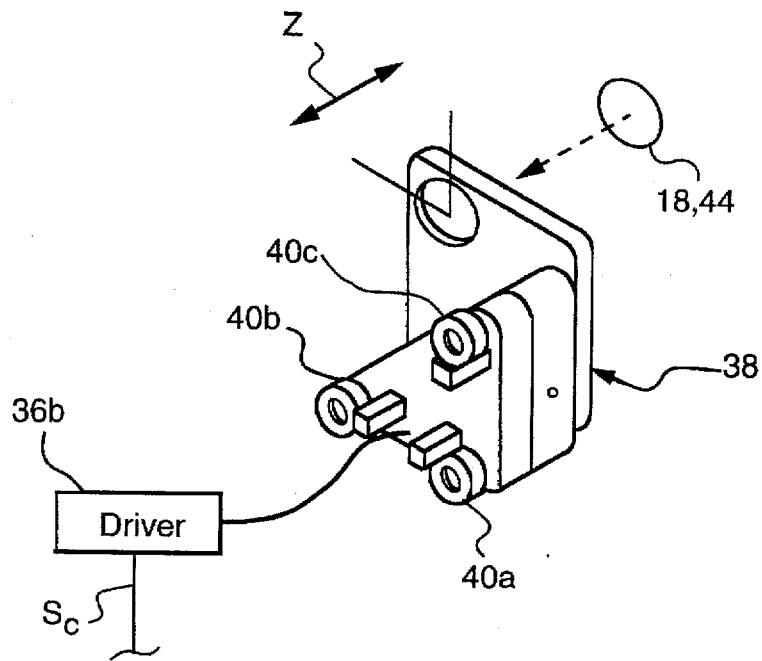
FIG. 2 is a schematic representation of an adjustable-tilt mirror mount for adjusting the primary optical path illustrated in FIG. 1 in accordance with one embodiment of the present invention.

An exemplary schematic embodiment of a corner mirror mount 38 supporting the primary mirror 18 therein is illustrated in FIG. 2. The primary mirror 18 is mounted in a plate supported at three points including a fixed point 40a, and two movable points defined at first and second piezoelectric transducers 40b and 40c arranged in a triangular configuration. The two transducers 40b,c are operatively joined to the driver 36b and in response thereto are effective for adjusting the vertical position of the mirror 18 along a reference Z axis for thereby controlling tilt of the mirror 18 in a conventional manner.

Other types of movable mirror mounts may also be used such as conventional galvanometer controlled mounts. For example, horizontal and vertical steering of the laser bee may be accomplished with two separate mirrors 18, one for each axis. One motor-driven mirror is aligned in series with another motor-driven mirror.

In another example, the mirror 18 is fixed or unmovable, and one or more movable mirrors are disposed downbeam of the primary lens 20 for steering the laser beam after the focusing lens to correct angular wander of the beam.

In the exemplary embodiment illustrated in FIG. 1, lateral wander of the reference spot 32 is directly analogous with lateral wander of the primary spot 22, with both being createdby the angular wander of the laser beam 14 itself. By measuring the lateral wander of the reference spot 32 it may be used for controlling the tilt of the primary mirror 18 to compensate or correct for the angular beam wander. In the FIG. 1 embodiment, the tilt mount 38 supports the primary mirror 18 to create an open-loop correction control since the angular beam wander incident on the primary mirror 18 is unaffected as the primary mirror 18 is tilted for reducing lateral wader of the primary spot 22. As indicated above, angular wander occurs on a time scale typical of thermomechanical instability which is typically on the order of about 10–100 Hz. The system electronics of the measuring means 34 and correcting means 36 are therefore sufficiently fast for correcting the lateral wander of the primary spot 22 as it develops with the angular wander of the laser beam 14.

In order to increase sensitivity of the measuring means 34, the reference focal length $f_r$ is preferably at least as large as, or greater than or equal to, the primary focal length $f_p$. For example, the magnitude of the lateral beam wander of the reference spot 32 may be increased by a factor of 10 by providing the reference lens 30 with a focal length 10 times that of the primary lens 20. The reference focal length may be a multiple of the primary focal length as determined by the speed of the PZT transducers 40b,c, the speed of the electrical circuits in the measuring means 34, the spatial resolution of the detector 34a, and the desired spatial limit of lateral beam wander desired at the primary spot 22. The faster the transducers 40b,c operate, the smaller the focal length multiple can be, or, the smaller the desired limit of lateral beam wander, the larger the focal length multiple should be. The reference lens 30, therefore, not only provides an accurate indication of the lateral beam wander at the primary spot 22, but also amplifies the magnitude of lateral beam wader by the suitably large reference focal length $f_r$.

Figure 3:
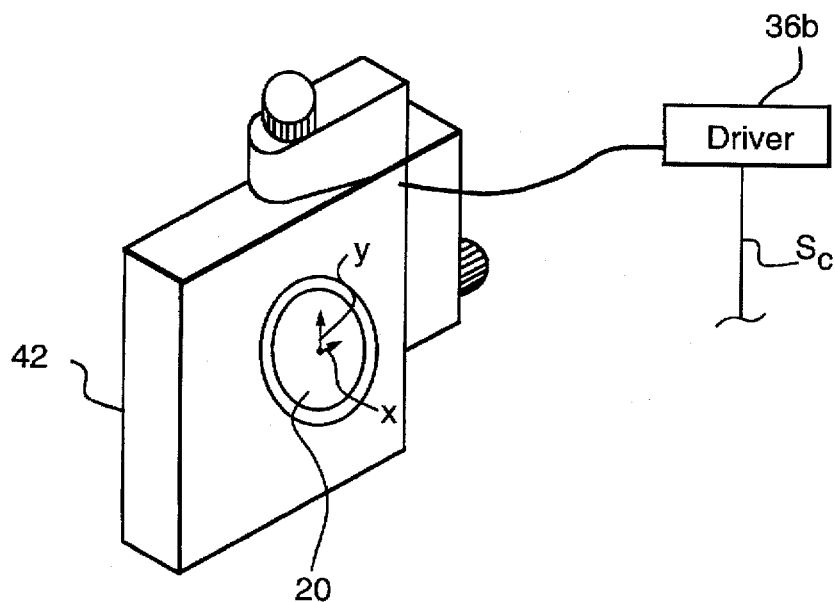
FIG. 3 is a schematic representation of an adjustable-position lens mount for adjusting the primary optical path in FIG. 1 in accordance with another embodiment of the present invention.

In an alternate embodiment of the invention illustrated in phantom in FIG. 1 and additionally in FIG. 3, the lateral wander of the primary spot 22 due to the angular wander of the laser beam 14 may be corrected by controlling the lateral position of the primary lens 20 instead of the tilt of the primary mirror 18. FIG. 3 illustrates schematically an adjustable-position mount 42 supporting the primary lens 20 for selectively translating the primary lens 20 transversely in the X-Y plane to laterally displace the focused beam and the corresponding primary spot 22. Transverse X-Y positioners for laterally moving optical fibers such as the fiber 26 illustrated in FIG. 1 are conventionally known and available. This type of conventional positioner may be suitably modified for driving the primary lens 20 as illustrated in FIG. 3 in the X-Y plane in response to the correction signal $S_c$. An X-Y fiber positioner is available from New Focus Inc., of Santa Clara, Calif., which also provides a suitable PZT tilt-mount which may be used for supporting the primary mirror 18.

Figure 4:
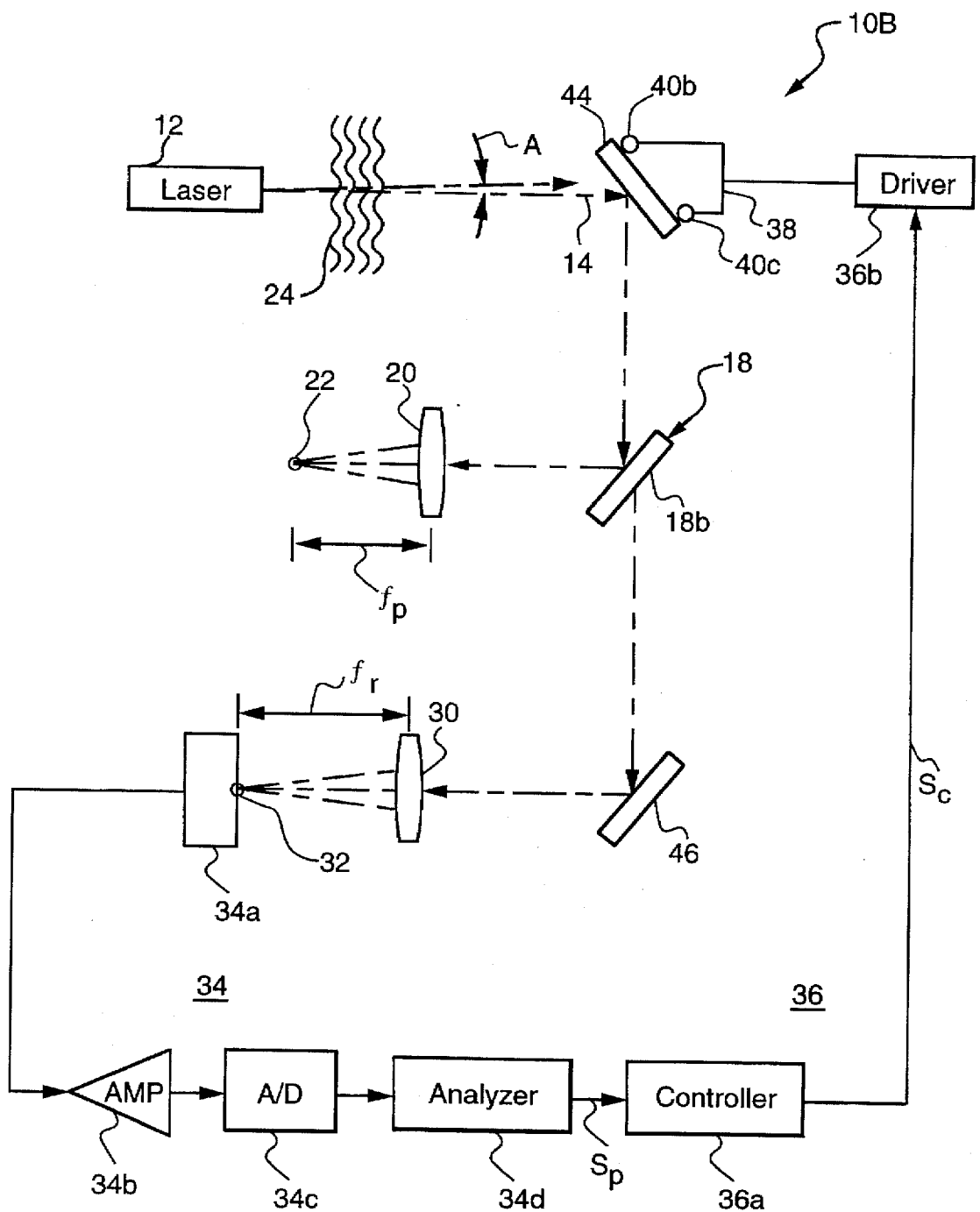
FIG. 4 is a schematic representation of a laser apparatus in accordance with another embodiment of the present invention including an additional mirror for providing closed loop adjustment of the primary optical path, and a folding mirror for reducing the envelope of the reference optical path.

Controlling tilt of the primary mirror 18 is accomplished in an open loop arrangement as illustrated in FIG. 1, and similarly, adjusting the lateral position of the primary lens 20 is also accomplished in an open loop arrangement. FIG. 4 illustrates schematically a closed loop arrangement for correcting angular bee wander. In this embodiment of the laser apparatus designated 10B, a secondary mirror 44 is disposed in the primary optical path between the laser 12 and the primary mirror 18 for reflecting the laser beam 14 therebetween. The primary mirror 18 is suitably fixed, and the adjustable-tilt mount 38 is instead used for supporting the secondary mirror 44 in an identical manner as that used for supporting the primary mirror 18 in the first embodiment illustrated in FIGS. 1 and 2. In this arrangement, angular beam wander of the laser beam 14 is reflected from the secondary mirror 44 onto the primary mirror 18, with corresponding lateral beam wander being produced at both the primary and secondary spots 22, 32.

The correction signal $S_c$ drives the driver 36b to correspondingly tilt the secondary mirror 44 for decreasing lateral bee wander of the primary spot 22. This is accomplished by decreasing the angular beam wander experienced by the primary mirror 18, which in turn decreases the lateral beam wander at the reference spot 32. This arrangement enjoys all of the advantages typically associated with closed-loop feedback control since the angular beam wander itself may be minimized or eliminated at the primary mirror 18, with corresponding reduction or elimination of lateral beam wander at the primary and reference spots 22, 32.

In accordance with another embodiment of the present invention also illustrated in FIG. 4, one or more conventional folding mirrors 46 may be disposed between the back face 18b of the primary mirror 18 and the reference lens 30 for folding the reference optical path in a more compact arrangement. The angular beam wander in the leakage laser beam is nevertheless propagated to the reference lens 30 for being measured in the lateral beam wander effected at the reference spot 32.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A laser apparatus comprising:

a laser for emitting a laser beam;

a primary mirror aligned with said laser for reflecting said beam from a front face thereof and leaking a portion thereof through a back face;

a primary lens aligned with said mirror front face for focusing said reflected beam at a primary focus spot, with said laser, mirror, and primary lens defining a primary optical path of said laser beam from said laser to said primary spot;

a reference lens aligned with said mirror back face for focusing said leakage beam at a reference focus spot in a reference optical path;

means aligned with said reference lens for measuring lateral position of said reference spot; and means coupled to said measuring means for correcting lateral wander of said primary spot in response to lateral movement of said reference spot due to angular wander of said laser beam on said mirror front face.

2. An apparatus according to claim 1 wherein said measuring means comprise:

an optical detector aligned with said reference lens; and an analyzer coupled to said detector for producing a position signal corresponding with said lateral position of said reference spot.

3. An apparatus according to claim 2 wherein said correcting means comprise:

a controller coupled to said analyzer for producing a correction signal in response to said position signal;

a driver coupled to said controller; and means coupled to said driver for adjusting said primary optical path in response to said correction signal to decrease said primary spot wander.

4. An apparatus according to claim 3 wherein said primary lens has a primary focal length, and said reference lens has a reference focal length being at least as large as said primary focal length.

5. An apparatus according to claim 3 wherein said adjusting means comprise an adjustable-tilt mount supporting said primary mirror for selectively tilting said primary mirror to tilt said reflected beam toward said primary lens.

6. An apparatus according to claim 3 wherein said adjusting means comprise an adjustable-position mount supporting said primary lens for selectively translating said primary lens to laterally displace said focused beam and primary spot.

7. An apparatus according to claim 3 wherein said adjusting means comprise:

a secondary mirror disposed in said primary optical path between said laser and said primary mirror;

an adjustable-tilt mount operatively joined to said driver and supporting said secondary mirror for selectively tilting said secondary mirror to tilt said laser beam toward said primary mirror.

8. An apparatus according to claim 3 further comprising at least one folding mirror disposed between said primary mirror back face and said reference lens for folding said reference optical path.

9. An apparatus according to claim 3 further comprising an optical medium disposed between said laser and said primary mirror, and having an index of refraction varying in time and position for effecting said angular wander in said laser beam.

10. An apparatus according to claim 3 further comprising an optical fiber having an inlet face aligned with said primary lens for receiving said primary focused beam, and an outlet face selectively positionable adjacent to a workpiece for laser machining thereof.

11. An apparatus according to claim 3 further comprising a spatial filter aligned with said primary lens for receiving said primary focused beam.

\* \* \* \* \*